US009796911B2

(12) United States Patent
Salla

(10) Patent No.: US 9,796,911 B2
(45) Date of Patent: Oct. 24, 2017

(54) ENVIRONMENTALLY ACCEPTABLE, LOW TEMPERATURE GEL BREAKING SYSTEM

(71) Applicant: HALLIBURTON ENERGY SERVICES, INC., Houston, TX (US)

(72) Inventor: Rajender Salla, Pune (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/316,746

(22) PCT Filed: Aug. 20, 2014

(86) PCT No.: PCT/US2014/051794
§ 371 (c)(1),
(2) Date: Dec. 6, 2016

(87) PCT Pub. No.: WO2016/028284
PCT Pub. Date: Feb. 25, 2016

(65) Prior Publication Data
US 2017/0204324 A1    Jul. 20, 2017

(51) Int. Cl.
| | | |
|---|---|---|
| *E21B 43/22* | (2006.01) | |
| *C09K 8/62* | (2006.01) | |
| *C09K 8/80* | (2006.01) | |
| *E21B 37/00* | (2006.01) | |
| *E21B 43/26* | (2006.01) | |
| *E21B 43/267* | (2006.01) | |

(52) U.S. Cl.
CPC .............. *C09K 8/62* (2013.01); *C09K 8/80* (2013.01); *E21B 37/00* (2013.01); *C09K 2208/26* (2013.01); *E21B 43/26* (2013.01); *E21B 43/267* (2013.01)

(58) Field of Classification Search
CPC ...... A61K 45/06; A61K 9/0014; A61K 9/122; A61K 47/12; C09K 2208/26; C09K 8/62; C09K 8/70; C09K 8/887; C09K 8/80; E21B 43/26; E21B 37/00; E21B 21/068; E21B 43/00; E21B 43/267
See application file for complete search history.

(56) References Cited

U.S. PATENT DOCUMENTS

| | | | |
|---|---|---|---|
| 4,919,904 | A | 4/1990 | Shulik et al. |
| 5,686,401 | A | 11/1997 | Willey et al. |
| 5,998,350 | A | 12/1999 | Burns et al. |
| 6,197,737 | B1 | 3/2001 | Willey et al. |
| 6,878,680 | B2 | 4/2005 | Kitko et al. |
| 7,923,417 | B2 | 4/2011 | Sanders et al. |
| 7,998,906 | B2 | 8/2011 | Saini et al. |

(Continued)

FOREIGN PATENT DOCUMENTS

EP    1900903 A    12/2008

OTHER PUBLICATIONS

International Search Report and Written Opinion; PCT Application No. PCT/US2014/051794; dated Apr. 30, 2015.

*Primary Examiner* — Zakiya W Bates
(74) *Attorney, Agent, or Firm* — Polsinelli

(57) ABSTRACT

Substituted lactam activators; gel breaking systems including at least one source of hydrogen peroxide and the at least one substituted lactam activator; and methods for introducing the gel breaking system into a well bore penetrating a subterranean formation so that the gel breaking system interacts with a synthetic polymer to break the synthetic polymer at low temperatures to release environmentally acceptable side products.

31 Claims, 2 Drawing Sheets

(56) References Cited

U.S. PATENT DOCUMENTS

| | | |
|---|---|---|
| 8,361,936 B2 | 1/2013 | Mukhopadhyay et al. |
| 2008/0173452 A1 | 7/2008 | Sanders et al. |
| 2010/0048431 A1 | 2/2010 | Saini et al. |
| 2010/0252264 A1 | 10/2010 | Hutchins et al. |
| 2010/0300967 A1 | 12/2010 | Dakin et al. |
| 2011/0006260 A1 | 1/2011 | Somerville-Roberts et al. |
| 2013/0228334 A1 | 9/2013 | Jiang et al. |
| 2014/0196897 A1 | 7/2014 | Lin et al. |

ENVIRONMENTALLY ACCEPTABLE, LOW TEMPERATURE GEL BREAKING SYSTEM

CROSS-REFERENCE TO RELATED APPLICATIONS

This application is a national stage entry of PCT/US2014/051794 filed Aug. 20, 2014, said application is expressly incorporated herein in its entirety.

FIELD

The disclosure relates generally to gel breaking systems, and more specifically gel breaking systems at low temperatures for oil and gas operations that release environmentally acceptable side products.

BACKGROUND

In oil and gas operations, drilling is conducted to reach subterranean formations, after which fracturing operations can be conducted. Fracturing operations involve the injection of various fluids along with proppants in order to access hydrocarbon reserves. Fracturing fluids can include cross-linking gels and/or synthetic polymers which can become entrenched within the formation rock. In order to degrade the cross-linked gels, oil and gas operations have employed gel breakers to break crosslinking gels, however, such gel breakers are efficient only at high temperatures, for example, above 80 degrees Celsius. Activators have also been employed with gel breaker systems.

BRIEF DESCRIPTION OF THE DRAWINGS

Implementations of the present technology will now be described, by way of example only, with reference to the attached figures, wherein.

DETAILED DESCRIPTION

Figure 1:
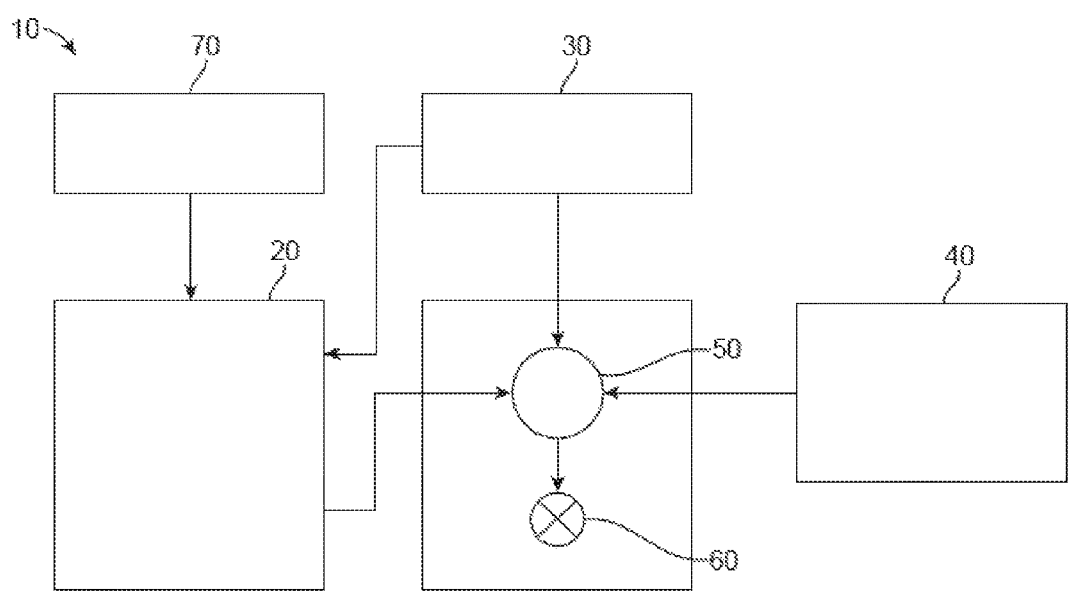
FIG. 1 is a diagram illustrating an example of a fracturing system that may be used in association with certain embodiments of the present disclosure.

The present disclosure may be understood more readily by reference to the following detailed description as well as to the examples included therein. It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other thing that "substantially" modifies, such that the component need not be exact. For example, substantially cylindrical means that the object resembles a cylinder, but can have one or more deviations from a true cylinder.

Terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, and the like orientations shall mean positions relative to the orientation of the wellbore or tool. As used herein, the term "treatment fluid" refers to any fluid that may be used in a subterranean application in conjunction with a desired function and/or for a desired purpose. The term "treatment fluid" does not imply any particular action by the fluid or any component thereof. Such operations and treatments include, but are not limited to, stimulation, completion, fluid loss control operations, and other similar applications.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

In fracturing operations, synthetic polymers are often added to treatment fluids to form viscosified treatment fluids. After the operation, to recover (and possibly recycle) the fluid, oftentimes the viscosifying synthetic polymer is broken (e.g., by breaking its backbone and/or polymer chains) so that the viscosity of the fluid is reduced, thereby allowing the fluid to flow back to the surface and be recovered. This process may be referred to in the art as "breaking the fluid." The compositions or components employed to degrade the polymer can be referred to as "breakers." Generally, the synthetic polymers used in subterranean application may be of high molecular weight and contain hydrocarbon backbones, which may be hard to break in a controlled manner. An example is a copolymer of acrylamide and acrylic acid that has a high molecular weight and can be used as a friction reducer. It contains a hydrocarbon backbone that may be hard to break. Often these polymers adsorb onto the formation or become incorporated within a filter cake. Because such polymers may be difficult to break, their incomplete removal from the filter cake ultimately may affect the permeability of the formation. Compositions that are used in this process to interact with the polymer so as to reduce the viscosity of the fluid may be referred to in the art as "breakers."

Various examples of the present disclosure provide for gel breaking systems and methods that are capable of breaking polymers and/or gels in oil and gas operations at low temperatures, and that produce environmentally acceptable side products.

According to various examples disclosed herein, there is provided a substituted lactam activator that can be used in conjunction with at least one source of hydrogen peroxide in order to break gels and/or polymers, particularly those used in oil and gas operations. In particular, the substituted lactam activator and the at least one source of hydrogen peroxide can react to produce an active oxidizer which acts to degrade the gel and a lactam which hydrolyzes to an amino acid byproduct. The substituted lactam and at least one source of hydrogen peroxide can be active at low temperatures, for example, including less than 80 degrees Celsius.

Other examples provide a gel breaking system that may include at least one source of hydrogen peroxide; and at least one of the above-mentioned substituted lactam activators.

Indeed, the gel breaking systems and methods may be utilized in many fracturing procedures. As illustrated in FIG. 1, an exemplary fracturing system 10 can include a fracturing fluid producing apparatus 20, a fluid source 30, a proppant source 40, and a pump and blender system 50. The fracturing system 10 can reside at the surface of a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used in fracturing the formation, for example, by being pumped through a work string 12 and downhole tool 100 (see FIG. 2) when in the open configuration. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system can also include additive source 70 that provides one or more additives, such as synthetic polymers which gel or which cross-link to form gels (other gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

When the cross-linkable gels are provided as the additive source 70, the gel breaking compositions having a substituted lactam activator and at least one source of hydrogen peroxide disclosed herein can be provided subsequent operations in order to degrade, or "break" the gel. The cross-linked gel can include synthetic polymers, which include polymers that do not occur naturally but may be formed artificially from petrochemicals, may be used in a variety of subterranean treatment fluids that may be used in a variety of operations and treatments conducted in oil and gas wells. The cross-linked gels can include for example polyacrylamides, poly (ethylene oxide), poly(vinylpyrrolidone), poly (acrylic acid), poly (methacrylic acid), poly(AMPS), poly (vinyl alcohol). The synthetic polymers may also include copolymers formed by the combination of monomers for example: FR-26LC™ and/or FR-56LC™ friction reducers available from Halliburton Energy Services, Inc.

The pump and blender system 50 receives the fracturing fluid and combines it with other components, including proppant from the proppant source 40 and/or additional fluid from the additives 70. The resulting mixture may be pumped down the well 60 and out through a downhole tool 100 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some or all of the different sources at a given time, and may facilitate the preparation of fracturing fluids using continuous mixing or "on-the-fly" methods. Thus, for example, the pumping and blender system 50 can distribute fracturing fluid and/or proppant through the multi-acting downhole tool 100 to the target subterranean zone.

Figure 2:
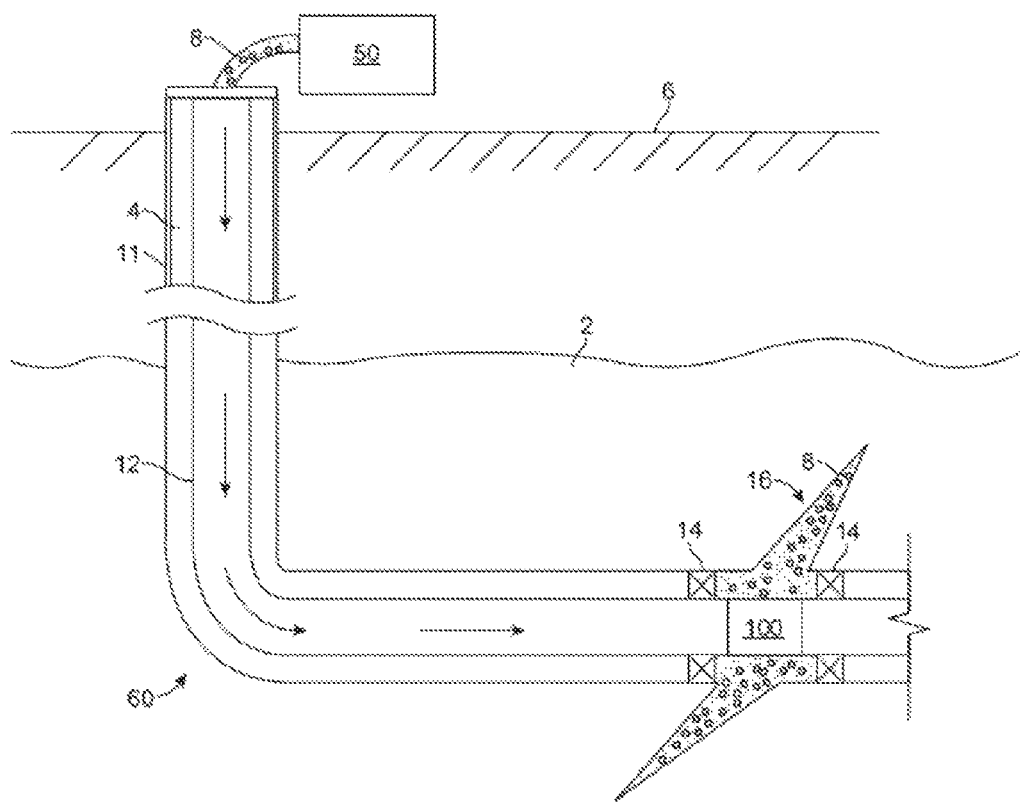
FIG. 2 is a diagram illustrating an example of a subterranean formation in which a fracturing operation may be performed in association with certain embodiments of the present disclosure.

FIG. 2 illustrates a well 60 performing a fracturing operation in a portion of a subterranean formation of interest 2 surrounding a well bore 4. The well bore 4 extends from the surface 6, and the fracturing fluid 8 is applied to a portion of the subterranean formation 2 surrounding the horizontal portion of the well bore through, for example, a downhole tool 100. The tool 100 can include ports, holes, or a sleeve which permits exit of fluid from the work string 12. Although shown as vertical deviating to horizontal, the well bore 4 may include horizontal, vertical, slant, curved, and other types of well bore geometries and orientations, and the fracturing treatment may be applied to a subterranean zone surrounding any portion of the well bore. The well bore 4 can include a casing 11 that is cemented or otherwise secured to the well bore wall. The well bore 4 can be uncased or include uncased sections. Perforations can be formed in the casing 11 to allow fracturing fluids and/or other materials to flow into the subterranean formation. In cased wells, perforations can be formed using shape charges, a perforating gun, hydro-jetting and/or other tools.

The well is shown with a work string 12 depending from the surface 6 into the well bore 4. The pump and blender system 50 is coupled to the work string 12 to pump the fracturing fluid 8 into the well bore 4. The working string 12 may include coiled tubing, jointed pipe, and/or other structures that allow fluid to flow into the well bore 4. The working string 12 can include flow control devices which control the flow of fluid from the interior of the working string 12 into the subterranean zone 2. The working string 12 may include ports that are spaced apart from the well bore wall to communicate the fracturing fluid 8 into an annulus in the well bore between the working string 12 and the well bore wall.

The working string 12 and/or the well bore 4 may include one or more sets of packers 14 that seal the annulus between the working string 12 and well bore 4 to define an interval of the well bore 4 into which the fracturing fluid 8 will be pumped.

In the area of the well bore 4 between packers 14, one or more fractures 16 may be created in the subterranean zone 2 at a sufficient hydraulic pressure. Proppant particulates in the fracturing fluid 8 may enter the fractures 16 where they may remain after the fracturing fluid flows out of the well bore. These proppant particulates may "prop" fractures 16 such that fluids may flow more freely through the fractures 16.

Subsequent fracking operations, the gel breaker composition disclosed having the substituted lactam activator and at least one source of hydrogen peroxide can be pumped into the well bore 4 in order to degrade and "break" cross-linked gel contained in the well bore 4 and formation. In general, the substituted lactam activator may increase the reactivity of available oxygen from the source of hydrogen peroxide for oxidation.

The at least one source of hydrogen peroxide may be any type of hydrogen peroxide source capable of giving free hydrogen peroxide at a low temperature in aqueous solutions. The low temperature can be less than about 80 degrees Celsius, less than about 70 degrees Celsius, less than about 60 degrees Celsius, less than about 50 degrees Celsius, less than about 40 degrees Celsius, less than about 30 degrees Celsius, less than about 20 degrees Celsius, less than about 10 degrees Celsius, or less than about 0 degrees Celsius.

Examples of suitable hydrogen peroxide sources may include, but are not limited to, organic and inorganic oxidizers, and combinations thereof. Examples of suitable hydrogen peroxide sources may include, but are not limited to peroxides, persalts, hypochlorite salts, peracids, and combinations thereof.

Examples of suitable peroxides may include, but are not limited to, inorganic peroxides, organic peroxides, and combinations thereof. Examples of suitable inorganic peroxides may include, but are not limited to alkali metal peroxides and alkaline earth metal peroxides. Examples of suitable alkali metal peroxides may include lithium peroxide, sodium peroxide, potassium peroxide, rubidium peroxide, cesium peroxide, francium peroxide, and combinations thereof. Examples of suitable alkaline earth metal peroxides may include magnesium peroxide, calcium peroxide, beryllium peroxide, strontium peroxide, barium peroxide, radium peroxide, and combinations thereof. Examples of suitable organic peroxides may include, but are not limited to urea-hydrogen peroxide, hydrogen peroxide, dibenzoyl peroxide, tertiarybutyl peroxide, urea peroxide, and combinations thereof.

Examples of suitable persalts may include, but are not limited to, inorganic persalts, persulfates, perborates, percarbonates, perphosphates, and combinations thereof.

Examples of suitable persulfates may include, but are not limited to, ammonium persulfate, alkali metal persulfates, alkaline earth metal persulfates, and combinations thereof. Examples of suitable alkali metal persulfates may include lithium persulfate, sodium persulfate, potassium persulfate, rubidium persulfate, cesium persulfate, francium persulfate, and combinations thereof. Examples of suitable alkaline earth metal persulfates may include magnesium persulfate, calcium persulfate, beryllium persulfate, strontium persulfate, barium persulfate, radium persulfate, and combinations thereof.

Examples of suitable perborates may include, but are not limited to, ammonium perborate, alkali metal perborates, alkaline earth metal perborates, and combinations thereof. Examples of suitable alkali metal perborates may include lithium perborate, sodium perborate, sodium perborate monohydrate, sodium perborate tetrahydrate, potassium perborate, rubidium perborate, cesium perborate, francium perborate, and combinations thereof. Examples of suitable alkaline earth metal perborates may include magnesium perborate, calcium perborate, beryllium perborate, strontium perborate, barium perborate, radium perborate, and combinations thereof.

Examples of suitable percarbonates may include, but are not limited to alkali metal percarbonates, alkaline earth metal percarbonates, and combinations thereof. Examples of suitable alkali metal percarbonates may include lithium percarbonate, sodium percarbonate, potassium percarbonate, rubidium percarbonate, cesium percarbonate, francium percarbonate, and combinations thereof. Examples of suitable alkaline earth metal percarbonates may include magnesium percarbonate, calcium percarbonate, beryllium percarbonate, strontium percarbonate, barium percarbonate, radium percarbonate, and combinations thereof.

Examples of suitable perphosphates may include, but are not limited to alkali metal perphosphates, alkaline earth metal perphosphates, and combinations thereof. Examples of suitable alkali metal perphosphates may include lithium perphosphate, sodium perphosphate, sodium pyrophosphate peroxyhydrate, potassium perphosphate, rubidium perphosphate, cesium perphosphate, francium perphosphate, and combinations thereof. Examples of suitable alkaline earth metal perphosphates may include magnesium perphosphate, calcium perphosphate, beryllium perphosphate, strontium perphosphate, barium perphosphate, radium perphosphate, and combinations thereof.

Examples of suitable hypochlorite salts may include, but are not limited to alkali metal hypochlorite salts, alkaline earth metal hypochlorite salts, and combinations thereof. Examples of suitable alkali metal hypochlorite salts may include lithium hypochlorite, sodium hypochlorite, potassium hypochlorite, rubidium hypochlorite, cesium hypochlorite, francium hypochlorite, and combinations thereof. Examples of suitable alkaline earth metal hypochlorite salts may include magnesium hypochlorite, calcium hypochlorite, beryllium hypochlorite, strontium hypochlorite, barium hypochlorite, radium hypochlorite, and combinations thereof.

Examples of suitable peracids may include, but are not limited to organic peracids of the formula

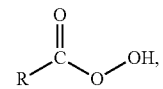

where R is an alkane, alkene, or alkyne.

The at least one source of hydrogen peroxide can be present in amount of from about 0.1 to about 99.9 weight percent based on the total weight of the gel breaking system, or from about 0.5 to about 99.5, or in the range of about 0.3% to about 7%, or in the range of from about 0.3% to about 4%. For example, the hydrogen peroxide source may be present in at least about 0.6% by weight (50 lb/Mgal) of the gel breaking system, and alternatively in the range of about 0.6% by weight (50 lb/Mgal) to about 3% by weight (250 lb/Mgal) of the gel breaking system, although much greater concentrations can be used. More generally, the hydrogen peroxide source may be present in the gel breaker compositions in a sufficient concentration to substantially reduce the viscosity of a treatment fluid or cross-linked gel or polymer.

The at least one substituted lactam activator can be present in amount of from 0.5 to 99.5 weight percent based on the total weight of the gel breaking system and more preferably in a range of about 0.001% to about 20% or from about 0.001% to about 8%. The at least one substituted lactam activator can be any substituted lactam including one selected from caprolactam, valerolactam, butyrolactam, and combinations thereof. The at least one substituted lactam activator can be substituted with any moiety, including a moiety selected from the group consisting of an acyl, a benzoyl, and combinations thereof.

According to some examples, the at least one substituted lactam activator can be an N-acyl caprolactam of the formula:

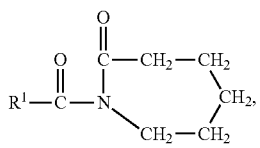

wherein R¹ is selected from hydrogen, an alkyl group, an aryl group, an alkaryl group, and an alkoxyaryl group. The R¹ group can include a number of carbon atoms within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, and 12 carbon atoms. For example, the R1 group can include from 1 to 12 carbon atoms.

The at least one substituted lactam activator can be a substituted benzoyl lactam having the formula:

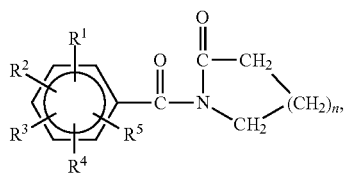

n can be 1, 2, or 3. $R^1$, $R^2$, $R^3$, $R^4$ and $R^5$ can be members selected from H, halogen, $NO_2$, alkyl, alkoxy, alkoxyaryl, alkaryl, alkaryloxy, amine salt, and substituents having a structure selected from:

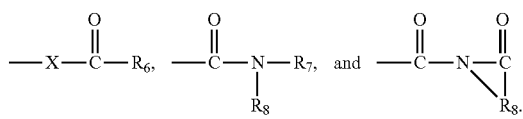

$R_6$ can be selected from H, alkyl, alkaryl, alkoxy, alkoxyaryl, alkaryloxy, and aminoalkyl. X can be selected from O, NH, and $NR_7$. $R_7$ can be selected from H and a $C_1$-$C_4$ alkyl group. $R_8$ can be selected from an alkyl group, a cycloalkyl group, and an aryl group. In some examples, at least one R substituent is not H. The R8 group can include a number of carbon atoms within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, and 12 carbon atoms. For example, the R8 group can include from 3 to 11 carbon atoms. In some examples, the at least one substituted benzoyl lactam can be a substituted benzoyl caprolactam.

As noted above, the substituted benzoyl lactam can include an amine salt and has the formula:

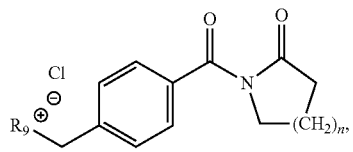

n can be 1, 2, or 3. $R_9$ can be a substituent having a structure selected from the group consisting of:

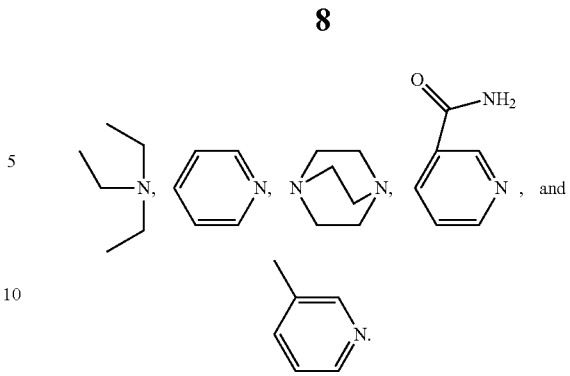

An exemplary, but non-limiting structure of a substituted benzoyl lactam including an amine salt can have the formula:

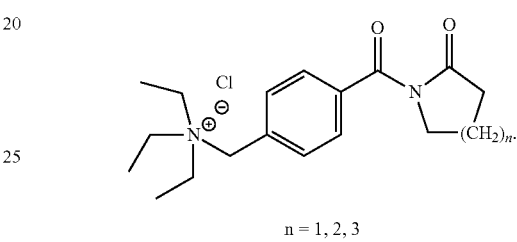

n = 1, 2, 3

The at least one substituted lactam activator and/or the gel breaking system described above can be used in a variety of methods, which can be useful for breaking a synthetic polymer or gel, particularly in a downhole oil or gas operation. Substituted amine salts in the activators can also work as clay control agents in subterranean. For example, various examples relate to method that involves introducing a gel breaking system into a well bore penetrating a subterranean formation so that the gel breaking system interacts with a synthetic polymer to break the synthetic polymer.

Various examples relate to gel breaking systems comprising activators derived from environmentally acceptable aminoacids. The gel breaking systems can also include at least one source of hydrogen peroxide, which can be used in conjunction with the activators. Many of the sources of hydrogen peroxide are environmentally acceptable enough to be used in hand wash and detergent preparations. The gel breaking systems according to various examples can be used to break gels in oil and gas operations at temperatures at or below 30 degrees Celsius to release only environmentally acceptable side products.

In some examples, the gel breaking system can comprise a benzoyl caprolactam activator, which releases benzoic acid and caprolactam as side products, which further hydrolyses to give aminocaproicacid. In this process, benzoyl caprolactam, benzoic acid, caprolactam, and aminocaproic acid are all environmentally acceptable components. An additional advantage of various examples is that many side products, such as amino acids, can be used as scrubbers for removal of acid gases including but not limited to $H_2S$, $CO_2$ in oil and gas operations.

Various examples relate to a method that involves introducing a gel breaking system into a well bore penetrating a subterranean formation so that the gel breaking system interacts with a synthetic polymer, such as the polymer gel or other viscosifying polymer mentioned above, to "break" the synthetic polymer. As discussed above, "breaking" a polymer involves cleaving chemical bonds along its backbone and/or polymer chains so that the viscosity of the fluid is reduced, thereby allowing the fluid to flow back to the surface and be recovered.

To break the synthetic polymer, various examples of the method further include allowing the gel breaking system to interact with the synthetic polymer at a low temperature. The low temperature can be less than about 80 degrees Celsius, less than about 70 degrees Celsius, less than about 60 degrees Celsius, less than about 50 degrees Celsius, less than about 40 degrees Celsius, less than about 30 degrees Celsius, less than about 20 degrees Celsius, less than about 10 degrees Celsius, or less than about 0 degrees Celsius.

The methods according to various examples allow the synthetic polymer to be substantially broken within a time period of from about 1 to about 72 hours. For example, the methods according to various examples allow the synthetic polymer to be substantially broken within a time period of about 24 hours.

The method can further involve allowing the components of the gel breaking system to form one or more acids. For example, benzoic acid, acetic acid, R—COOH. where R=carbons from 1 to 12 liner or branched. R=aromatic with substitutions

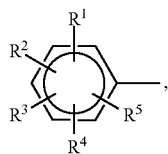

where $R^1$, $R^2$, $R^3$, $R^4$ and $R^5$ can be members selected from H, halogen, $NO_2$, alkyl, alkoxy, alkoxyaryl, alkaryl, alkaryloxy, amine salt.

The formation of one or more acids can be particularly beneficial, because the one or more acids can chelate with at least one metal present in the well bore. The at least one metal can be, but is not limited to calcium, magnesium, zirconium, aluminum, titanium, iron, copper.

The one or more acids can also lower the pH of one or more fluids within the well bore. The pH of the one or more fluids can be reduced by about 2 to about 6 pH units, or by about 3 to about 5 pH units. According to other examples, the pH of the one or more fluids can be reduced to a pH value in a range of from about 3 to about 6, or from about 4 to about 5.

The method according to various examples can provide an effective alternative to current commercial gel breakers. A person having ordinary skill in the art will be readily equipped to select a particular activator from the activators described herein based on the required temperature, environmental regulations, and any requirements for which acid and amino acids should be released from the process. According to various examples, all components used and produced by the method are environmentally acceptable, inexpensive, and safe to use in large scale. All components of the system and method can meet even the most sensitive environmental regulation, such that the systems and methods could be used in Northsea operations. As already discussed, an added benefit of the method is that the released side products can be useful in many other ways, including but not limited to pH lowering agents, scrubbers, chelating agents, and corrosion inhibitors. Finally, since the systems and methods described herein enable breaking polymers, polymer gels, and other viscosifying polymers without the addition of excess oxidizer, and also at low temperatures, the systems and methods can have an extended applicability relative to existing systems.

EXAMPLES

A benzoyl caprolactam activator can be used in conjunction with an inorganic oxidizer. This gel breaking system can be introduced into a wellbore comprising a polymer or gel to be broken. The polymer or gel can be but is not limited to a xanthan gel, a diutan gel, guar, guar derivatives, cellulose, cellulose derivatives, galactomannan gum and combinations thereof. The benzoyl caprolactam activator and the inorganic oxidizer react to form perbenzoic acid and a caprolactam, such as a caprolactam amide. The perbenzoic acid is an active oxidizer, which can break the gel to release benzoic acid. The benzoic acid can lower the pH within the wellbore and can also chelate with one or more metals within the wellbore. The caprolactam amide can undergo hydrolysis to produce an amino acid, such as caproic acid. The caproic acid can chelate with one or more metals within the wellbore and can also be utilized as a scrubber for acid gas removal.

Separation of the caproic acid is not required. When amino acids come in to contact with acid gases like $CO_2$ or other corrosive gases, they will be absorbed when they are under pressure of 100 to 3000 psi. Ultimately amino acids suppress the corrosive nature of acid gases. Primary sterically hindered aminoacids may be used as promoters for alkali metal salts in acid gas scrubbing.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

It should be understood that the compositions and methods are described in terms of "comprising," "containing," or "including" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention.

What is claimed is:

1. A gel breaking system comprising:
   at least one source of hydrogen peroxide; and
   at least one substituted lactam activator,
   wherein the at least one substituted lactam activator is substituted with a moiety selected from the group consisting of an acyl, a benzoyl, a substituted benzoyl, and combinations thereof.

2. The gel breaking system according to claim 1, wherein the at least one source of hydrogen peroxide is one selected from the group consisting of a peroxide, a persalt, a hypochlorite salt, a peracid, and combinations thereof.

3. The gel breaking system according to claim 1, wherein the at least one source of hydrogen peroxide is present in amount of from about 0.3% to about 7% weight percent based on the total weight of the gel breaking system.

4. The gel breaking system according to claim 1, wherein the at least one substituted lactam activator is present in an amount of from about 0.001% to about 20% weight percent based on the total weight of the gel breaking system.

5. The gel breaking system according to claim 1, wherein the at least one substituted lactam activator is selected from the group consisting of caprolactam, valerolactam, butyrolactam, and combinations thereof.

6. The gel breaking system according to claim 1, wherein the at least one substituted lactam activator is an N-acyl caprolactam of the formula:

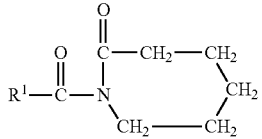

wherein $R^1$ is selected from the group consisting of hydrogen, an alkyl group, an aryl group, an alkaryl group, and an alkoxyaryl group.

7. The gel breaking system according to claim 6, wherein $R^1$ comprises from 1 to 12 carbon atoms.

8. The gel breaking system according to claim 1, wherein the at least one substituted lactam activator is a substituted benzoyl lactam having the formula:

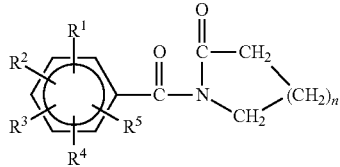

wherein n is from 1 to 3;
wherein $R^1$, $R^2$, $R^3$, $R^4$ and $R^5$ are members selected from the group consisting of H, halogen, $NO_2$, alkyl, alkoxy, alkoxyaryl, alkaryl, alkaryloxy, amine salt, and substituents having a structure selected from the group consisting of:

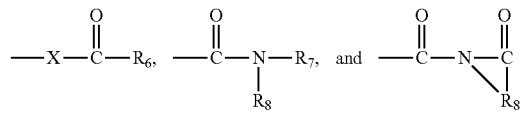

wherein $R_6$ is selected from the group consisting of H, alkyl, alkaryl, alkoxy, alkoxyaryl, alkaryloxy, and aminoalkyl;
wherein X is selected from the group consisting of O, NH, and $NR_7$,
wherein $R_7$ is selected from the group consisting of H and a $C_1$-$C_4$ alkyl group;
wherein $R_8$ is selected from the group consisting of an alkyl group, a cycloalkyl group, and an aryl group,
wherein $R_8$ comprises from 3 to 11 carbon atoms; and
wherein at least one R substituent is not H.

9. The gel breaking system according to claim 8, wherein the substituted benzoyl lactam comprises the amine salt and has the formula:

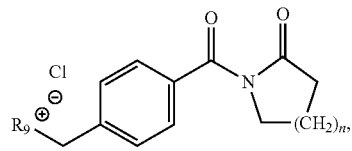

wherein n is from 1 to 3; and
wherein $R_9$ is a substituent having a structure selected from the group consisting of:

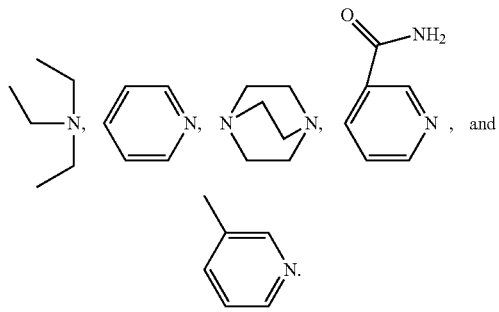

10. The gel breaking system according to claim 8, wherein the at least one substituted benzoyl lactam is a substituted benzoyl caprolactam.

11. A method comprising introducing a gel breaking system into a well bore penetrating a subterranean formation so that the gel breaking system interacts with a synthetic polymer to break the synthetic polymer,
   wherein the gel breaking system comprises
   at least one source of hydrogen peroxide; and
   at least one substituted lactam activator,
   wherein the at least one substituted lactam activator is substituted with a moiety selected from the group consisting of an acyl, a benzoyl, a substituted benzoyl, and combinations thereof.

12. The method according to claim 11, wherein the at least one source of hydrogen peroxide is one selected from the group consisting of a peroxide, a persalt, a hypochlorite salt, a peracid, and combinations thereof.

13. The method according to claim 11, wherein the at least one source of hydrogen peroxide is present in amount of from about 0.3% to about 7% weight percent based on the total weight of the gel breaking system.

14. The method according to claim 11, wherein the at least one substituted lactam activator is present in an amount of from about 0.001% to about 20% weight percent based on the total weight of the gel breaking system.

15. The method according to claim 11, wherein the at least one substituted lactam activator is selected from the group consisting of caprolactam, valerolactam, butyrolactam, and combinations thereof.

16. The method according to claim 11, wherein the at least one substituted lactam activator is an N-acyl caprolactam of the formula:

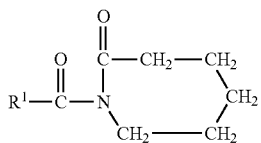

wherein $R^1$ is selected from the group consisting of hydrogen, an alkyl group, an aryl group, an alkaryl group, and an alkoxyaryl group.

17. The method according to claim 16, wherein $R^1$ comprises from 1 to 12 carbon atoms.

18. The method according to claim 11, wherein the at least one substituted lactam activator is a substituted benzoyl lactam having the formula:

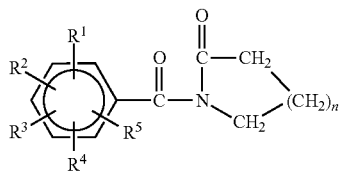

wherein n is from 1 to 3;
wherein $R^1$, $R^2$, $R^3$, $R^4$ and $R^5$ are members selected from the group consisting of H, halogen, $NO_2$, alkyl, alkoxy, alkoxyaryl, alkaryl, alkaryloxy, amine salt, and substitutents having a structure selected from the group consisting of:

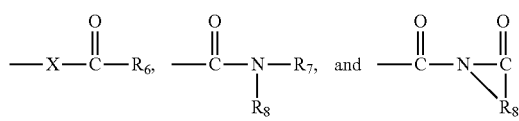

wherein $R_6$ is selected from the group consisting of H, alkyl, alkaryl, alkoxy, alkoxyaryl, alkaryloxy, and aminoalkyl;
wherein X is selected from the group consisting of O, NH, and $NR_7$;
wherein $R_7$ is selected from the group consisting of H and a $C_1$-$C_4$ alkyl group;
wherein $R_8$ is selected from the group consisting of an alkyl group, a cycloalkyl group, and an aryl group, wherein R8 comprises from 3 to 11 carbon atoms; and
wherein at least one R substituent is not H.

19. The method according to claim 18, wherein the substituted benzoyl lactam comprises the amine salt and has the formula:

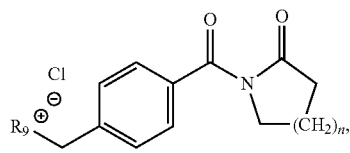

wherein n is from 1 to 3; and
wherein $R_9$ is a substituent having a structure selected from the group consisting of:

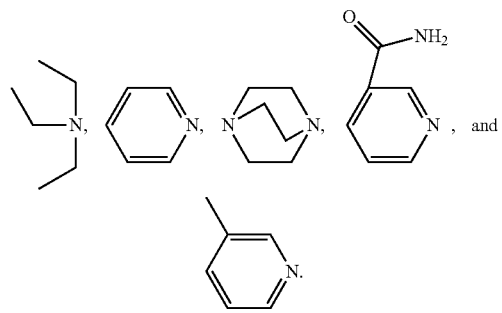

20. The method according to claim 18, wherein the at least one substituted benzoyl lactam is a substituted benzoyl caprolactam.

21. The method according to claim 11, further comprising allowing the gel breaking system to interact with the synthetic polymer at a temperature of less than about 80 degrees Celsius, and the synthetic polymer is substantially broken within about 24 hours.

22. The method according to claim 21, wherein the temperature is less than or equal to about 30 degrees Celsius.

23. The method according to claim 11, further comprising allowing the components of the gel breaking system to form one or more acids.

24. The method according to claim 23, wherein the one or more acids chelate with at least one metal present in the well bore.

25. The method according to claim 24, wherein the at least one metal is selected from the group consisting of calcium, magnesium, zirconium, aluminium, titanium, iron, copper.

26. The method according to claim 25, wherein the pH of the one or more fluids is reduced to a range of from about 3 to about 6.

27. The method according to claim 24, wherein the one or more acids lower a pH of one or more fluids within the well bore.

28. The method according to claim 27, wherein the pH of the one or more fluids is reduced by about 3 to about 5 pH units.

29. The method according to claim 11, wherein introducing the gel breaking system into the well bore penetrating the subterranean formation comprises pumping the gel breaking system from an additive source into a downhole portion of the well bore.

30. The method according to claim 29, wherein the gel breaking system is pumped from the additive source into a downhole portion of the well bore via at least one of a work string or downhole tool.

31. The method according to claim 29, wherein the gel breaking system is introduced into a subterranean formation using one or more pumps.

\* \* \* \* \*